United States Patent

[11] 3,588,683

[72] Inventor Donald Lloyd
 Houston, Tex.
[21] Appl. No. 720,534
[22] Filed Apr. 11, 1968
[45] Patented June 28, 1971
[73] Assignee Gulf Coast Pipe Inspectors, Inc.
 Houston, Tex.

[54] METHOD AND APPARATUS FOR NONDESTRUCTIVE TESTING OF FERROMAGNETIC ARTICLES, TO DETERMINE THE LOCATION, ORIENTATION AND DEPTH OF DEFECTS IN SUCH ARTICLES UTILIZING THE BARKHAUSEN EFFECT
 13 Claims, 12 Drawing Figs.

[52] U.S. Cl. .................................................. 324/37
[51] Int. Cl. .............................................. G01r 33/12
[50] Field of Search .......................................... 324/37, 40, 34

[56] References Cited
 UNITED STATES PATENTS
 2,098,064  11/1937  Pfaffenberger ............ 324/37
 2,353,211  7/1944   Zuschlag .................. 324/40
 2,770,773  11/1956  Cooley ..................... 324/37
 2,963,644  12/1960  Nuttall .................... 324/37
 3,247,453  4/1966   Quittner ................... 324/37
 3,271,664  9/1966   Mountz et al. ............. 324/40
 3,284,701  11/1966  Kerbow .................... 324/37
 3,401,332  9/1968   McClurg et al. ............ 324/40
 FOREIGN PATENTS
 936,033   9/1963   Great Britain ............. 324/40
 OTHER REFERENCES
McMaster, R.; NONDESTRUCTIVE TESTING HANDBOOK, Vol. II The Ronald Press 1963 pp. 30.11 (Copy in 324— 37)

Primary Examiner—Rudolph V. Rolinec
Assistant Examiner—R. J. Corcoran
Attorney—Hyer, Eickenroht, Thompson and Turner ABSTRACT: Methods of and systems for use in electromagnetically analyzing ferromagnetic articles wherein a magnetic field having an intensity in which the Barkhausen effect is substantial is induced in the article to be analyzed, and a low-frequency alternating magnetic field is applied to an area of interest of the magnetized article causing the magnetic domain to move. A detector-coil assembly disposed in the vicinity of the low-frequency alternating magnetic field detects the magnetic intensity induced in response to the magnetic field and alternating magnetic field. It has been found that the magnetic intensity in the vicinity of a defective area is of a different magnitude than in the vicinity of a sound area, and this information is useful in determining various parameters of the article. One system makes a quick scan inspection of pipe to determine the presence and general location of defects. In such system, several transversely spaced resonator-detector units longitudinally traverse the pipe and a record is made from each unit. In a system for analyzing a defect, a resonator-detector unit longitudinally traverses the defective area in stepped transverse increments, and the detected magnetic intensity is recorded and later played back and fed into an oscilloscope for pictorial representation and photographing. In a system for analyzing welds, there are several transversely spaced detectors whose output signals are sequentially sampled and recorded. The recording is later fed into an oscilloscope and photographed. In a system measuring the relative wall thickness of an article, the signal from an article of unknown thickness is compared with a signal from an article of known wall thickness. The generated signals, when processed and fed into an oscilloscope, are determinative of relative thickness. A system for making relative wall thickness measurements on a continuous basis is also disclosed.

Fig-5

Donald Lloyd
INVENTOR.

INVENTOR.
DONALD LLOYD
BY
Browning, Hyer, Eickenroht & Thompson
ATTORNEYS

METHOD AND APPARATUS FOR NONDESTRUCTIVE TESTING OF FERROMAGNETIC ARTICLES, TO DETERMINE THE LOCATION, ORIENTATION AND DEPTH OF DEFECTS IN SUCH ARTICLES UTILIZING THE BARKHAUSEN EFFECT

This invention relates to methods and systems for use in analyzing ferromagnetic articles, and is particularly advantageous in the nondestructive electromagnetic testing of such articles.

It is well known that a magnetic field will be induced in a ferromagnetic article positioned in a dynamic electrical field, and that various types of defects, such as fatigue cracks, slag intrusions, holes, laps, seams, conditions of stress and other conditions representing structural change, structural parting, abrupt variations in thickness, etc., will produce anomalies in such induced magnetic field. If a detector is moved across the induced magnetic field, any anomalies which distort the induced magnetic field will, as a result of a change in the rate of intensity or the direction, generate a signal in the detector. Systems utilizing this principle are used to inspect tubular goods for defects. As far as is known, all present commercial electromagnetic inspection systems depend upon scanning the magnetic field surrounding a magnetized article and detecting any change in the rate of intensity or the direction of such field.

The scanned field results from flux leakage and is relatively weak. The difference in intensity or direction produced by a defect is therefore relatively small, particularly for the small defects sought to be detected by such systems. In addition, background or noise level is relatively high and is of such a nature that amplification of the defect signal correspondingly amplifies the noise signal. A signal to noise ratio in the neighborhood of four to one is generally accepted. Many efforts have been made to increase the signal to noise ration. Much of the effort has been directed toward decreasing the level of the background noise; however, as mentioned, a four to one signal to noise ratio is still considered standard. Accordingly, it is an object of this invention to provide methods of and systems for use in analyzing ferromagnetic articles which substantially improve upon the signal to noise ratio.

One of the difficulties in electromagnetically inspecting new pipe is that there is usually a substantial amount of mill scale on the outer surface of the pipe as a result of heat treatment. Used pipe has a similar problem due to rust. Mill scale and rust are various forms of ferrous and ferric oxides which have magnetic characteristics different than the body of the pipe. Therefore, they create numerous and varied magnetic flux discontinuities producing noise signals in the detector system which tend to mask defect-produced signals. In addition, mill scale and rust are paramagnetic materials and their intensity of magnetization linearly increases as the magnetizing field is increased and does not reach saturation at the same level as ferromagnetic materials. Therefore, instead of leveling off when the magnetic induction of the article approaches saturation, the noise signal from mill scale and rust is steadily increasing. Inasmuch as it is necessary to detect small changes in the induced magnetic field so that small defects will be located, it is customary in electromagnetic inspection to utilize very high amplification, often in the order of 20,000 times. However, the noise signal as well as the defect-produced signal is amplified. Therefore, it has always been a problem to distinguish a defect-produced signal from the noise signal background, particularly when utilizing a high-intensity magnetizing field. Accordingly, it is another object to provide methods of and systems for electromagnetically inspecting tubular goods which utilizes an induced magnetic field well below saturation and in which, as a result of a relatively high signal to noise ratio, amplification is considerably reduced.

With prior electromagnetic inspection systems, it has been customary to produce a magnetic field, either longitudinal or circumferential, and then at a constant rate traverse the length of the article with a search coil to locate anomalies. Since the signal generated results from a rate of change, it is necessary that the speed at which the field is traversed be maintained relatively constant or the indication will not be constant. Accordingly, it is another object of the present invention to provide methods of and systems for use in inspecting tubular goods which does not require a constant speed during scanning.

Further, if a defect extends in the same direction as the induced magnetic field, it will not produce a detectable anomaly. Therefore, transverse defects are detectable only by a longitudinal field and longitudinal defects are detectable only by a circumferential field, and two runs are required in order to detect both longitudinal and transverse defects. Moreover, on small diameter tubular goods, a circumferential field provides a relatively short magnetic path and there is a tendency to have sequent poles around which there is flux leakage which may give false indications. Therefore, it is a further object to provide methods of and systems for use in electromagnetically inspecting ferromagnetic tubular goods which utilize an induced magnetic field having a long magnetic path which eliminates sequent poles and reflects both longitudinal and transverse defects on a single pass.

In the inspection of tubular goods, it is important to ascertain not only the location of the defects, but also to determine the type of defect and the depth thereof, all with a relatively high degree of accuracy. For example, the American Petroleum Institute Standards, Sec. 5a, which pertains to customer acceptability of oilfield pipe provides that if the depth of a defect in the pipe is in excess of 12½ percent of the tabulated wall thickness, it shall be deemed excessive and the pipe, therefore, considered unacceptable. While present commercial electromagnetic inspection services ascertain the location of many defects they do not indicate the type of defect nor the depth thereof, and for such determination it is necessary to physically examine the defect. One method of testing for the depth of defect is to grind away up to 12½ percent of the pipe wall. If the defect is still apparent at such depth the pipe is rejected and returned to the manufacturer; however, if the defect is no longer apparent the customer is obliged to accept the pipe. Hence, either the manufacturer or the customer receives a pipe having a rather substantial portion of its wall ground away. Accordingly, it is another object of this invention to provide methods of and systems for electromagnetically inspecting ferromagnetic articles which not only determine the location of the defect, but which are also capable of nondestructively determining the type of defect and its depth.

In theory, it was sometimes assumed that when a piece of metal is progressively magnetized from one end to the other, the elementary magnets thereof were uniformly oriented so as to set up North and South poles at the extremities of the article with a uniformly varying intensity of magnetization in between. As a practical matter, however, such rarely if ever occurred, and examination of the intensity of magnetic forces lengthwise of the article showed marked irregularities. Accordingly, it was difficult to determine if a signal resulted from an irregularity in the field or from an anomaly caused by a defect. In an effort to reduce such irregularities, it was suggested in U.S. Pat. No. 2,650,344 that the article be vibrated by a relatively high frequency alternating current (500 cycles per second) while it was being magnetized in order that the elementary magnets of the article would orient themselves into domains which were of substantially uniform length, the length of the domains being related to the structural characteristics of the material with the continuous ends of alternate domains having opposing North poles and opposing South poles. The purpose of such a system is to form a regular magnetic pattern to make it easier to detect anomalies as a detector coil moves across the field. However, while such a system may provide a more regularly induced magnetic field, the method of locating defects is still the same, i.e., defects are located by detecting anomalies in the induced field by relative movement between the coil and field with the signal being a rate of change indication.

If a ferromagnetic article is magnetized by subjecting it to a constantly increasing field, the magnetic induction of the article does not increase linearly as the magnetizing field is increased, but rather increases in accordance with the magnetization curve of the material. As can be seen from the inspection of a magnetization curve, initially, due to reluctance, ferromagnetic material tends to resist magnetization; however, as the magnetizing field is increased sufficiently to overcome reluctance the susceptibility point is reached and thereafter, depending upon the permeability of the particular material, the magnetic induction of the article increases at a specific rate. After a certain level of magnetic induction has been reached, the article becomes magnetically saturated and a further increase in the magnetizing field fails to substantially increase the magnetization of the article. Due to hysteresis, when the magnetizing field is subsequently decreased, the magnetization of the article does not decrease along the same curve by which it has increased; instead, it follows a curve which lies above the magnetization curve. This property, which is measured by the residual induction when a saturating magnetic force is removed, is known as retentivity.

Permeability is a constant; therefore, once magnetization is started it will increase at a specific rate. However, it has been found that reluctance is a variable and, therefore, the application of the same magnetizing field to the same article will not always produce the same degree of magnetization since, if the reluctance is different, it will take a different magnetizing force to produce susceptibility. On the other hand, once an article has been magnetized to saturation, the decrease in residual induction will be at a specified rate depending on the slope of retentivity.

In accordance with the "Barkhausen effect," the process of magnetization is not smooth; rather, as the magnetizing force is increased, the elementary magnets flop over in varying-sized groups. Therefore, although the magnetization curve is indicated by a smooth line, in reality it is a series of "minute steps." The steps in the magnetization of ferromagnetic substances occur in irregular frequency and magnitude as the magnetizing force is continuously increased or decreased. It is assumed that such steps are the alignment of the magnetic domains or groups. The steps in the magnetization curve are not all of the same magnitude, rather, during some portions of the magnetization curve there appear to be greater domain movement than at other portions of the curve. In other words, there is an area of steep steps which means that a slight change in the magnetizing field results in a substantial change in magnetic intensity of the article, see FIG. 9.

In accordance with my invention, the magnetization is maintained below saturation and, preferably, in the range in which the Barkhausen effect swells the greatest, i.e., where for slight changes in the intensity of the magnetic field applied to the article the greatest changes in the induced magnetic intensity of the article occur. A low frequency magnetic field of relatively small magnetic alternating current is applied to an area of interest. The low frequency alternating magnetic field appears to cause the magnetic domains in such area to move or to oscillate back and forth when the frequency of the alternating current field is substantially in resonance with the movement of the magnetic domains. It has been found that there is a difference in energy level between an area of sound material and an area containing a defect. The movement of the domains or energy level may be measured by a stationary detector coil located in the vicinity of the low frequency alternative magnetic field, in which a voltage signal is induced proportional to the rate of movement and the magnetic intensity of the domains.

If there is a defect in the local area subject to the low frequency alternating, the magnetic field signal generated by the detector-coil assembly is of a greater magnitude around the edge of the defect than the signal for sound material. Accordingly, by scanning the article and measuring the magnetic intensity, the location of defects may be determined.

It also appears that there is a cone of low intensity in the middle of the high intensity signal. The difference in signal intensity may result from the fact that the defect acts as a barrier and the domains have to speed up around the defect in order to align, with such movement probably producing localized eddy currents. In any event, there is an increase in energy level. For the purpose of this application, the measured function representing the magnetic intensity induced in an article to be inspected by the magnetic fields applied to it will be referred to as magnetic intensity.

As a result of my improved method, the difference between the magnetic intensity signal of a defective area and the background signal of a sound area is in the neighborhood of 20 to one. Thus, the amplification thereof may be substantially reduced relative to the amplification normally used for systems relying upon rate of change indications. The reduction in amplification also reduces the amplification of the noise signal. Further, while the low frequency alternating magnetic field creates disturbances within the base material of the article, such field does not create disturbances in the mill scale or rust, whereby the defect signal generated is virtually free of noise background created by mill scale or rust. Moreover, since local magnetic intensity is the measured function, there is no necessity to maintain a constant speed of traverse as is necessary in systems relying upon rate of change indications.

Such method can be utilized for analyzing ferromagnetic articles in a number of respects. For example, it may be utilized in a system to make a quick scan of pipe to determine the presence and location of defects therein. In such a system, a circumferential residual magnetic field is established in the pipe. A carriage having an encircling coil and a plurality of transversely spaced resonator-detector units capable of producing a low frequency alternating magnetic field and detecting the magnetic intensity resulting from the movement of the magnetic domains is positioned on the pipe. The encircling coil is energized to produce a longitudinal field which twists the circumferential field to a helical field. The intensity of the induced magnetic field is maintained below the point of saturation, preferably in the range of the greatest Barkhausen effect. The resonator-detector unit referred to includes a first resonator section through which an alternating current electrical signal of relatively small magnitude is used to generate an alternating magnetic field that is applied to the area of interest of the pipe, and a second detector section including a detector coil in which an electrical signal is induced which is proportional to the magnetic intensity in the area of interest of the pipe. After energizing the low frequency resonators to induce the low frequency alternating magnetic field to set the magnetic domains in motion, the carriage traverses the length of the article and the magnitude of the magnetic intensity detected is detected and recorded. As with past systems, such a system only indicates the location of an anomaly and does not give any indication of the type of defect or the depth thereof. After the quick scan, those pipes which have been marked as containing defects are then subjected to further investigation.

By using a helical field, most defects commonly found in new tubular goods can be detected on a single scan, eliminating the double-scanning now customarily required in commercial practice. Moreover, by using a helical field, the length of the magnetic path is extended and the possibility of sequent poles is greatly reduced. Accordingly, with such a system, it is possible on a single pass to clearly detect anomalies produced by defects in the test specimen. Provisions are made to mark the pipe when anomalies are located.

The suspected pipes are again magnetized in order to determine the major longitudinal axis of a defect. A probe having a resonator and a detector-coil assembly which can be fully rotated about the axis of the resonator is placed in the vicinity of the defect. The magnetic intensity resulting from the application of a low frequency alternating magnetic field is such that the major longitudinal axis of the defect and the general boundaries thereof can be defined. The approximate location of the deepest point of penetration can also be determined.

Accordingly, it is possible to not only localize areas of defects but, by determining the major longitudinal axis and general boundaries, have information often making it possible to evaluate the type of defect.

If further information concerning the defect is desired, the defect may be analyzed in detail. Knowing the type of defect, an induced magnetic field can be produced on which the defect will have the greatest effect. A single low frequency resonator and detector-coil assembly may then traverse the defect in stepped increments making measurements on a continuous basis on the longitudinal scan. These measurements, together with a longitudinal sync signal, may be fed directly to an oscilloscope or recorded on a magnetic tape which can be later fed into the oscilloscope. A photograph of the picture produced by the oscilloscope may be made for detailed study.

The method may also be utilized in a system for analyzing welds. In such system, a unit having a resonator with several detector-coil assemblies in transverse alignment is mounted on a carriage containing a DC magnetizing coil. The carriage is mounted over the weld for longitudinal traverse. The detector-coil assemblies are electronically sequenced so that the measured intensity is sampled in predetermined increments. The sampled intensities are recorded on magnetic tape and fed into an oscilloscope which produces a picture of the welded area. The picture is photographed for study.

It has been found possible with such a method to measure the deepest point of penetration of a defect and, by comparing such signal with a signal for a sound nominal wall thickness signal, determine the depth of penetration. Therefore, if the defect does not extend over 12½ percent of the body wall thickness, it is not necessary to unnecessarily grind away material which not only mars the surface but also tends to decrease the strength thereof.

It has also been found possible with such a system to accurately determine the wall thickness of an article. In such a case, the resonator-detector unit is stationarily positioned over the location. Instead of using a steady induced magnetic field, the intensity of the induced field is decreased at a constant rate. By comparing the position on the retentivity slope of the hysteresis loop at which the signal from the detector coil of an unknown article which signal is a function of the square area equals the signal of a test specimen, the wall thickness can be determined. As previously mentioned, reluctance is a variable; therefore, in making wall thickness measurements, the retentivity slope of the hysteresis loop is utilized. Accordingly, the magnetizing field is decreased at a constant rate rather than being increased. Again, the generated signal is fed into an oscilloscope for presentation and photographing.

Wall thickness measurements may be made on a continuous basis, in which case the magnetizing coils produce a steady induced magnetic field and move with the resonator-detector unit. While the strength of the magnetizing field remains static, the direction of the field will change as the unit is set in motion and have the same effect as decreasing the field at a constant rate. Again, by comparing the position on the retentivity slope at which the magnetic intensity of an unknown article equals the magnetic intensity of a test specimen, the wall thickness can be determined.

Accordingly, by applying a low frequency alternating magnetic field to a magnetized article, it is possible to not only determine the location of defects but also to determine numerous parameters of the defect, including its depth.

For further objects and advantages and for a better understanding of the invention, attention is now directed to illustrative embodiments illustrated in the following drawings and described in the description.

FIG. 6A is a graphic presentation of one way in which the lines of force may be effected by the defect illustrated in FIG. 6.

FIG. 10 is a representation of a photograph of the cathode ray tube illustrating the presentation of wall thickness, the cross section of the pipe and depth of defect are also included.

As can be seen from the foregoing, the methods for use in electromagnetic analyzing ferromagnetic articles can be used to make a quick survey to determine if an article contains defects, to determine the major longitudinal axis and define the general boundaries of defects and to fully analyze such defects. Moreover, it can also be used to determine wall thickness of an article, and can be used to analyze welds or other specific areas of interest.

One novel feature is the application of a very low frequency alternating magnetic field to an article which has been magnetized to an intensity where the Barkhausen noise swells the greatest. In such range of magnetization it appears that the magnetic domains are in a state of flux, i.e., a slight increase or decrease in magnetizing field results in the movement of a considerable number of domains. Therefore, the application of a very low frequency alternating magnetic field causes the domains to shift from one position to another. In effect, the domains seem to move harmoniously back and forth and in resonance with the alternating magnetic field. It has been found that, for ferromagnetic articles, the frequency of the alternating magnetic field should be less than 20 cycles per second or less, and that if the frequency is increased above 20 cycles per second the movement of the domains seems to stop or at least substantially decrease.

In order to obtain the desired magnetization for any article, a detector coil is placed in the vicinity of the alternating magnetic field and the frequency of the alternating magnetic field is steadily increased until peak magnetic intensity, as indicated by a meter connected to the detector coil, is reached. Such point is normally determined by observing the sharp dropoff. The frequency is then decreased slightly so that during operation a slight increase in frequency will not substantially affect the harmonious movement of the domains. The magnetic intensity of the article may be measured by spot checks or by traversing the article. It has been found that the magnetic intensity surrounding a defect will differ from the magnetic intensity of a sound article. One reason for the change in magnetic intensity may be that the defect forms a barrier and, therefore, the domains have to move faster around the defect in order to align. This is similar in effect to the movement of water around a barrier. Therefore, it has been found that if the field is directed into the defect there will be an area of high intensity around the edges of the defect with a cone of low intensity in the center, see FIG. 6A.

Figures 1, 2, 3:
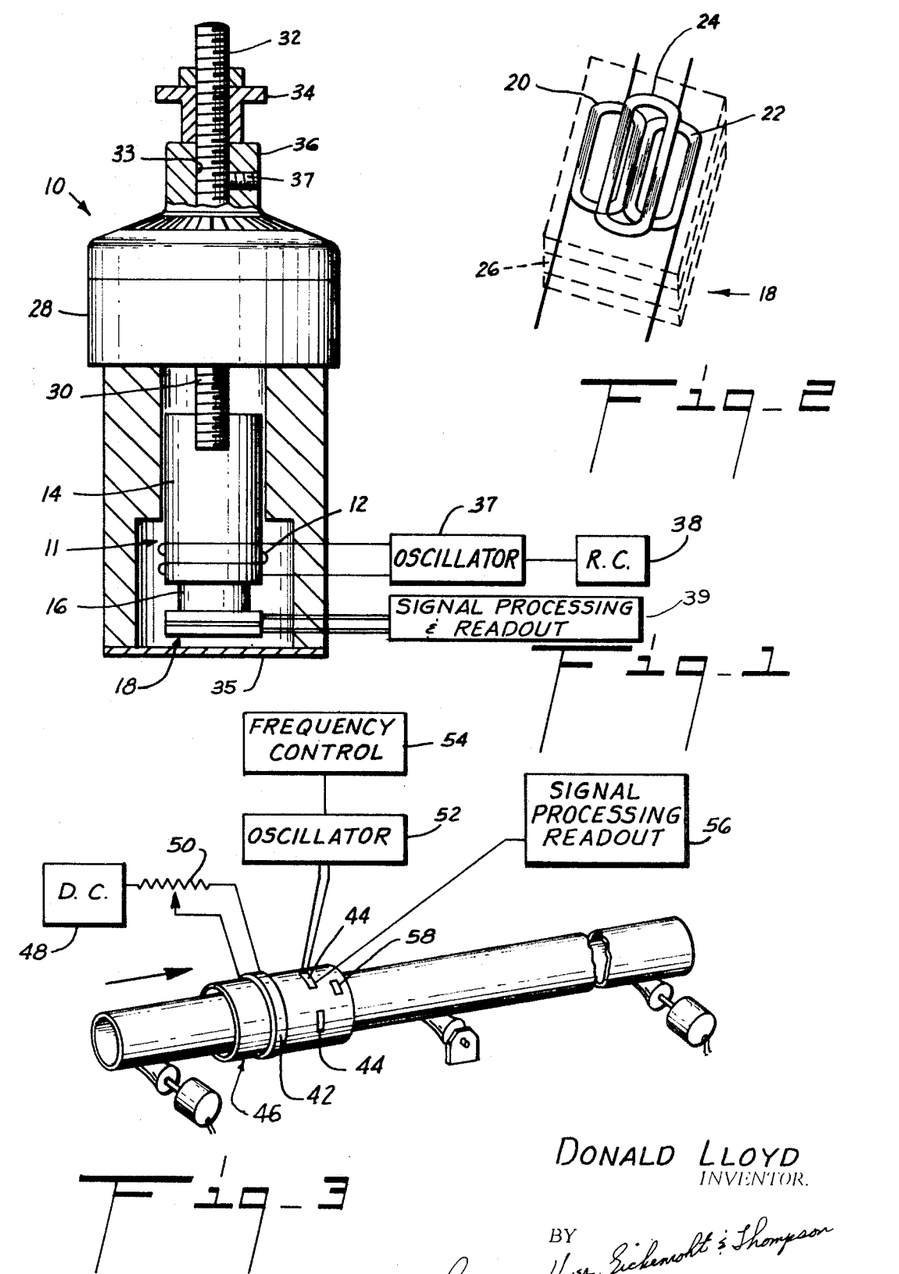
FIG. 1 is a cross-sectional view of a resonator-detector unit.
FIG. 2 is an isometric view of the detector-coil assembly used in the resonator-detector unit illustrated in FIG. 1.
FIG. 3 is a diagrammatic view of a system for performing a quick scan survey on tubular goods illustrating the magnetizing, resonating, detecting instrumentalities and the electrical instrumentation.

A resonator-detector unit 10 which may be utilized to produce the low frequency alternating magnetic field and detect the resulting movement is illustrated in FIG. 1. Such unit may be used as the probe to determine the major longitudinal axis and define the general boundaries of a defect. As illustrated in FIG. 1 the resonator-detector unit 10 includes a resonator section 11 in which a coil 12 is energized by an alternating current electrical signal from an oscillator to produce an alternating magnetic field, and a detector section in which an electrical signal is induced in a detector-coil assembly 18 in response to the magnetic intensity of the article inspected. It can be seen that the resonator section 11 has a coil 12 formed of 75 turns of No. 40 wire wrapped around a soft iron core 14. The core directs the alternating magnetic field toward the magnetized article. Spaced from the lower end of core 14 by a nonferrous spacer 16 is a detector-coil assembly 18, formed of three coils 20, 22 and 24. Bottom coils 20 and 22 which are wound in opposition may each be formed from 200 turns of No. 47 wire. The top coil 24 may be formed from 100 turns of No. 47 wire. Coils 20 and 22 are preferably connected together at one end and across a potentiometer or variable resistor 24a (shown in FIG. 5) at their other ends. Coil 24 is connected between the connections between coils 20 and 22 and the center tap of potentiometer 24a and the signal representing induced magnetic intensity is taken off at the center tap of potentiometer 24a. In this way coil 24 is effectively shunted by each of coils 20 and 22 so that signals of the same magnitude induced in each of these coils will cancel each other. Potentiometer 24a can be varied to balance the cancelling signals. Coils 20 and 22 are spaced from coil 24 by a spacer 26 and the assembly potted, see FIG. 2. By securing detector-coil assembly 18 to resonator 11, if there is any movement of the core due to oscillation, the detector-coil assembly will correspondingly move and coils 20, 22 and 24 move together so that any signals induced in them will cancel each other out. Thus, no noise will be produced from this movement. As can be seen in FIG. 2, the detector coils are elongated in one direction and planar with their axis perpendicular to the test piece.

The resonator and detector-coil assembly are mounted in a case 28 formed of nonferrous material. A member 30 having threads 32 at its outer end is attached to the top of core 14. The member 30 extends through an opening 33 in the top of case 28. A threaded member 34 is threadingly engaged with member 30 whereby the core and detector-coil assembly may be raised or lowered relative to the bottom of case 28. Unlike prior art electromagnetic systems which measure rate of change, it is not necessary for detector-coil assembly 18 to be in contact with the article and the bottom of case 28 is provided with a cover 35 which protects detector-coil assembly 18. Attached to the top of the case is a rotating device 36 for rotating detector-coil assembly 18 about the detector coil assembly to tune in the highest signal. A set screw 37 locks the member 30. With such arrangement, the detector-coil assembly may be rotated about its axis until the detector output signal is peaked. At this point, the direction of elongation of the detector coils is parallel to the major longitudinal axis of the defect; accordingly, its direction may be determined.

Resonator 11 is attached to a multivibrator type negative feed back oscillator 37 which is capable of delivering an amplified sine wave output of 3—20 cycles per second. A frequency control 38, which may be an R-C circuit, is provided so that tee frequency of oscillation may be varied. The detector-coil assembly 18 is attached to read out circuitry 39.

The article to be analyzed is magnetized by subjecting it to a direct current magnetic field. The direction of magnetization will depend upon the type of analysis to be performed. If new oilfield pipe is being inspected, it may be desirable, as previously mentioned, to provide a helical field, since in such case any anomalies other than a defect extending in the direction of the helical field will produce an anomaly in the induced field. Hence, both longitudinal and transverse defects will produce detectable anomalies. Moreover, with a helical field, the magnetic path is of considerable length and the probability of developing sequent poles, which often happens in short fields, is virtually eliminated.

One method of producing such an induced helical field in pipe is to first pass a conductor through the pipe and apply a sufficient charge of direct current to the conductor to produce a fully saturated, circumferential magnetic field in the pipe. The current is then turned off and the induced field decreases to residual. A circumferential coil is then placed about the pipe to produce a longitudinal field. Probe 10 may then be placed on the pipe and oscillator 37 turned on. The frequency of the oscillator is adjusted until the signal in read out circuitry 39 reaches peak intensity. With the resonator still producing the low frequency alternating magnetic field the direct current to the circumferential coil is increased until the signal again reaches peak intensity. At such time, the magnetization of the article has been increased to a point where the Barkhausen noise is swelling the greatest.

By applying a longitudinal field to an article already having a residual circumferential field, the circumferential field is twisted to a helical field. As a rule, the major axes of most mill defects do not run more than 15° from the longitudinal axis of the pipe. It has been found that in arriving at the range at which the Barkhausen effect swells the greatest, the applied longitudinal field does not twist the residual circumferential field more than 45°. Accordingly, common mill-type defects will produce anomalies in the induced helical field.

In order to make a quick scan of new oilfield pipe, a circumferential coil 42 and several resonator-detector units 44 may be mounted on a carriage 46, as shown in FIG. 3. The circumferential magnetizing coil is connected to a source of DC power 48 having a control 50. The resonator-detector units 44 are generally similar to probe 10; however, core 14 will be larger and there may be several sets of detector-coil assemblies. The resonator-detector units are transversely spaced about the circumference of the carriage, see FIG. 3. As can be seen, the resonator is connected to an oscillator 52 which is capable of providing a sine wave output of 3—20 cycles per second. The oscillator is provided with a frequency control 54 so that the frequency of such oscillation may be varied. The detectors are connected to a read out device 56 containing a meter or a strip chart recorder. The pipe may be moved past the carriage or the carriage may move along the pipe. In either event, it is not necessary to rotate the pipe. Moreover, since the signal does not depend upon rate of change, it is not necessary to maintain the speed of the relative motion constant. The carriage may be provided with a marking device 58 to mark any defects uncovered during the traverse of the pipe.

Once a defect is located, its longitudinal axis may be determined by placing probe 10 over the defect of the magnetized article and rotating detector-coil assembly 18 until the greatest intensity is reached. The greatest depth of penetration may be approximately located by determining the peak intensity in the area.

Figure 4:
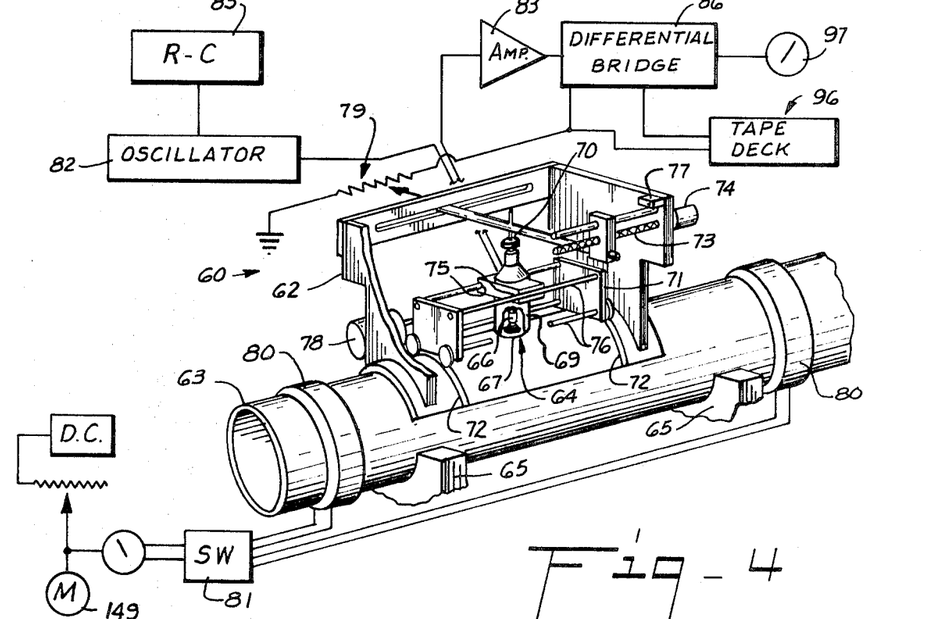
FIG. 4 is a view similar to FIG. 3 illustrating a system for analyzing a defect.

If further analysis of the article is deemed desirable, it may then be analyzed in detail by an analyzer 60, see FIG. 4. The analyzer has a frame 62 positioned over a pipe 63 which is mounted in a cradle 65. MOunted in frame 62 is a resonator-detector scanner 64 generally similar to probe 10 in that it has a resonator 66 and a detector-coil assembly 67 which is attached to the end of the resonator. Resonator 66 is similar to resonator 11, having a coil wound around a soft iron core. Detector-coil assembly 67 is similar to detector-coil assembly 18, having a pair of opposing or oppositely wound coils and a balancing coil. The assembly is mounted in a case 69 which is provided with a coil rotating device 70 and means to raise and lower the resonator and detector. The scanner 64 is mounted in a carriage 71 which travels along tracks 72. The carriage is connected to a lead screw 73 which is driven by a motor 74. The upper end of the scanner 64 is mounted by a low-friction bearing 75 in rails 76. At the end of each longitudinal traverse, the scanner contacts a microswitch 77 which energizes a Leadex 78 which indexes carriage 71 one increment. A longitudinal sync mechanism 79 is also mounted on frame 62.

Positioned about the pipe are circumferential coils 80–80 for inducing a magnetic field in pipe 63. After the pipe has been analyzed by probe 10 it is often possible to determine the kind of defect. In such event, the analyzer is set up to produce the direction and intensity of a magnetic field on which the defect will have the greatest effect. Therefore, in some instances, it may be desirable to have coils 80—80 connected in bucking arrangement and, in some instances, to dispense with the coils and use a yoke. In any event, a biasing-induced magnetic field is applied to the pipe. As can be seen, coils 80—80 are connected to a variable intensity DC source which can be regulated to provide the desired magnetizing field. A switching arrangement 81 to change direction of fields may be provided.

Figure 5:
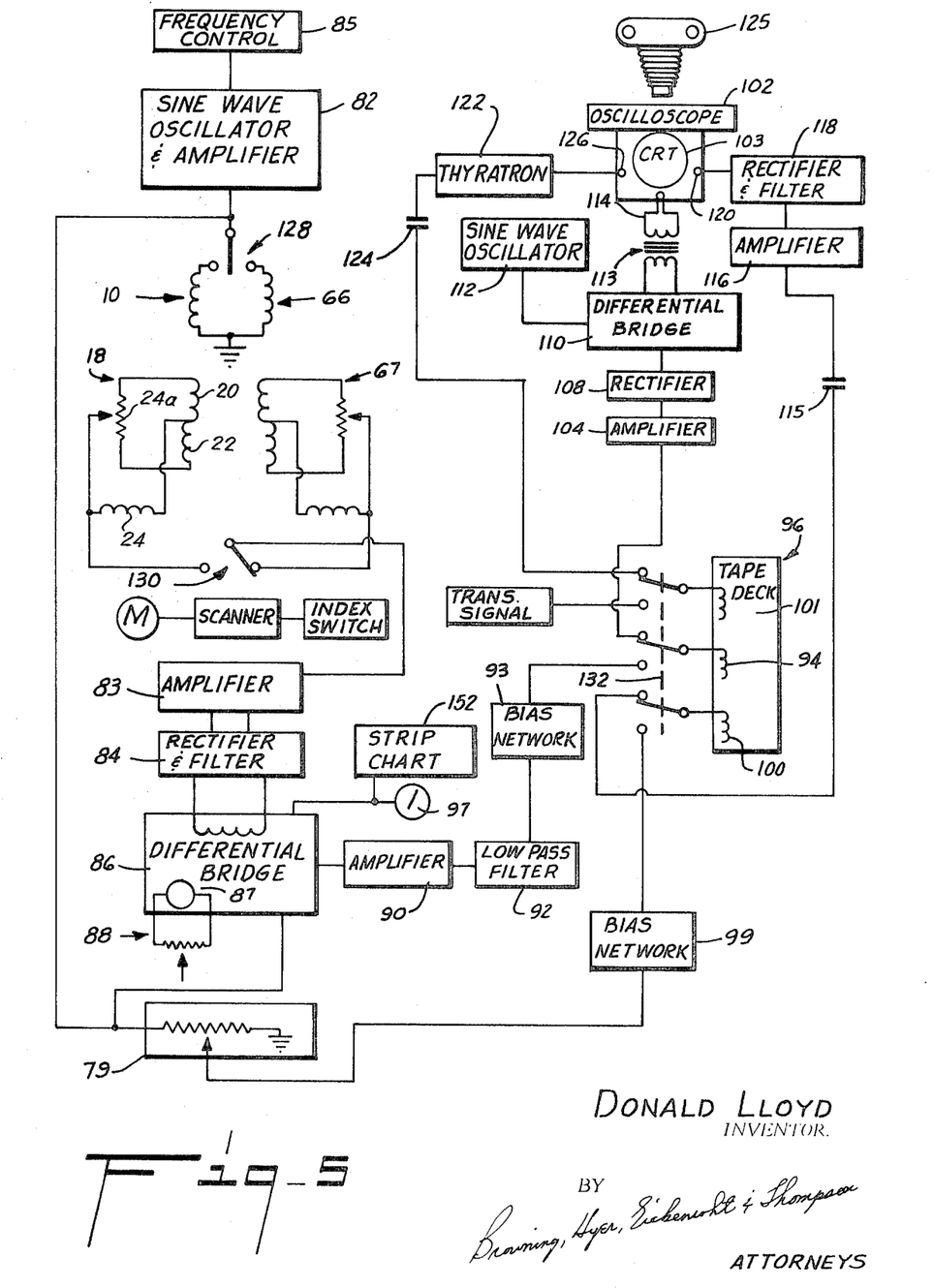
FIG. 5 is a block and schematic diagram of the electrical instrumentation of the system illustrated in FIG. 4.

The electronics for the various systems are generally similar. FIG. 5 illustrates the recording system for the analyzer. As can be seen, there are connections permitting utilization of other resonator-detector units and other read out devices. The coil of resonator 66 is connected to a sine wave oscillator 82 which is capable of delivering 3—20 cycles per second, 1½ volt alternating current. An R—C network 85 provides frequency control for oscillator 82.

The signal from detector-coil assembly 67 is fed to an AC amplifier 83 which is capable of providing a gain of up to 10,000. The amplified AC is then fed into a rectifier and filter circuit 84 which rectifies the AC to DC. The DC signal is then compared in a differential bridge or comparison circuit 86 to a regulated DC voltage produced by a standard cell 87. A potentiometer 88 which is directly calibrated in millivolts is connected to standard cell 87. Whenever the rectified detector voltage is greater than the opposing voltage of the regulated DC from cell or battery 87, a resultant voltage signal is produced. The output of oscillator 82 is also connected to circuit 86 and modulates the resultant signal to produce an alternating current signal in phase with the output of oscillator 82. This signal is amplified at 90 and then filtered by low pass filter 92 to take out high frequency noise. The filtered signal then goes through a biasing network 93 to a recording head 94 having gain control of a tape deck 96. An AC voltmeter 97 may be in the circuit to use as a visual check and also available for use in setting the intensity of the induced magnetic field. Connections are also available for a strip chart recorder 152 or other recording devices.

The signal from oscillator 82 is also fed into longitudinal sync mechanism 79 of the analyzer. The signal from it is fed through a biasing network 99 to recording head 100 of tape deck 96. A transverse sync signal is also fed into recording head 101 of the tape deck. It has been found that with programmed tape the start of the tape can be used for this purpose. Other means may be used if desired.

The tape may then be played back and fed into an oscilloscope 102 having a cathode ray tube 103. On playback, the tape speed may be 10—30 times the recording speed so that pulses on the cathode ray tube will be above the persistency of vision.

The signal from head 94 which contains the magnetic intensity signal is fed into an amplifier 104 which provides intensity modulation. Amplifier 104 has a band pass filter which responds to 200—1000 cycles per second keeping out noise outside this range. The signal from amplifier 104 is rectified by rectifier 108 and is then fed into a differential bridge 110 which is fed in phase with a signal from a one KC sine wave oscillator 112. The signal is balanced out and the off-balanced portion amplified by the differential bridge and the amplified signal is fed into a step-up transformer 113, then into the intensity modulation input 114 of oscilloscope 102. The signal is sufficiently amplified to provide the voltage necessary to blank out the phosphor of the cathode ray tube.

The longitudinal sync signal from head 100 is fed from a capacitor 115 to an amplifier 116 and then a rectifier-filter 118. The resulting DC sawtooth wave form is fed into the longitudinal sync input 120 of the oscilloscope.

As mentioned, the beginning of the tape can initiate the transverse beam by triggering a thyraton 122 which samples the charge on a capacitor 124; this signal is fed into the transverse input 126 of oscilloscope 102 where it initiates the transverse sweep of the cathode ray tube.

Figures 6, 8, 9:
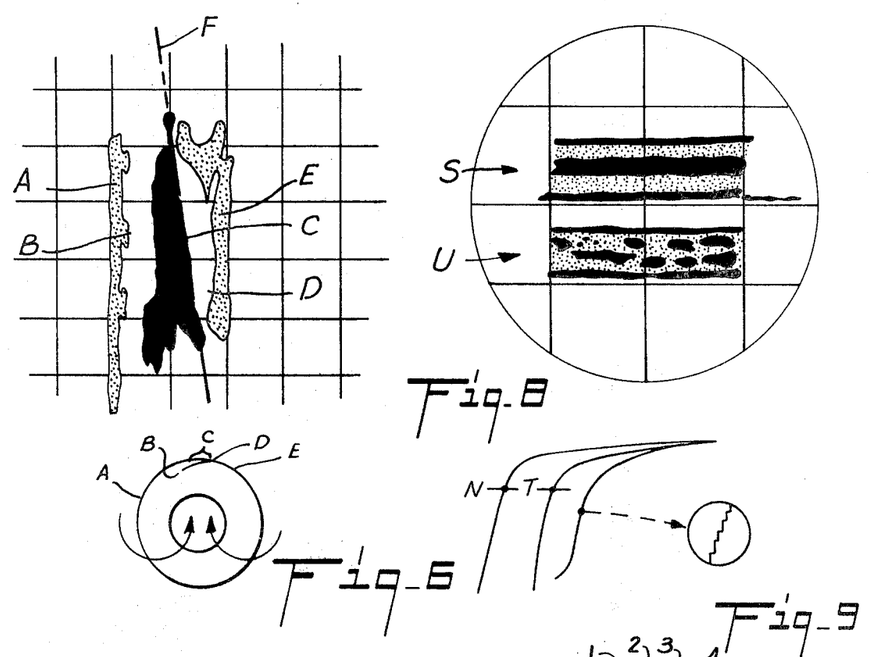
FIG. 6 is a representation of a photograph from the cathode ray tube illustrating a presentation of a defect, the cross section of the pipe and defect is included.
FIG. 8 is a representation of a photograph from the cathode ray tube illustrating the presentation of a survey of a welded area.
FIG. 9 is a diagrammatic view of a portion of a typical hysteresis loop particularly illustrating the retentivity slope used in the determination of wall thickness, and including the magnification of a small portion of the permeability slope to illustrate the Barkhausen effect.

Accordingly, as the scanner moves across the area of the article having the defect, the detector-coil assembly 67 measures the magnetic intensity. This signal is amplified and recorded together with a longitudinal sync signal on magnetic tape. At the end of each traverse, a microswitch is energized which causes the scanner to be indexed one step. As mentioned, the tape can be timed to make one revolution for each longitudinal scan. The tape may then be played back and the information fed into the cathode ray tube where the defect is portrayed. A photograph may be taken of the illuminated cathode ray tube by camera 125. FIG. 6 illustrates one such photograph. Also shown in FIG. 6 is a cross section of the pipe, the defect and direction of the magnetizing field. FIG. 6A illustrates graphically the development of the magnetic intensity shown in FIG. 6. At A in FIG. 6, an area of magnetic intensity for a sound article is shown. This level is background level and can be controlled and is used as a reference basis. As the scanner is stepped transversely of the article it encounters the flaw. B shows the reaction at the first edge encountered. As can be seen in FIG. 6A, this is an area of high intensity; therefore, the signal was higher and the phosphor of the cathode ray tube brighter. However, the photograph is a positive and the opposite appears. As the scanner continues to be stepped across the defect, an area of low intensity is encountered. This is marked C in both FIGS. 6 and 6A. As the scanner continues to progress, the intensity increases until the second edge of the defect is encountered. This point is marked D in FIGS. 6 and 6A. The remaining portion of FIGS. 6 and 6A (marked E) reflect normal intensity. Although it does not show on 6A, the angle of the defect with regard to the longitudinal length can clearly be seen in FIG. 6 and is marked F.

In order to obtain good definition, the longitudinal scan lines should be no less than 20 per centimeter apart.

By adjusting and varying the direction and intensity of the magnetizing field, the field on which the defect will have the greatest affect can be chosen. When this is done, the resulting detector output signals will produce the sharpest perception of the defect on the oscilloscope and thus provide the greatest amount of information concerning the defect.

Figure 7:
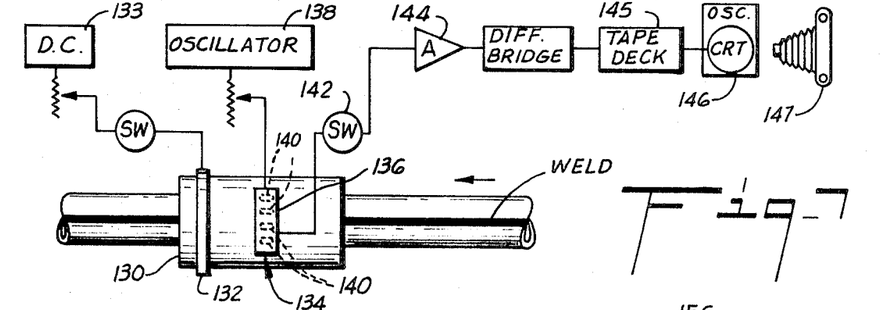
FIG. 7 is a view similar to FIG. 3 illustrating a system for analyzing welds.

FIG. 7 illustrates a device utilizing the present invention for the analysis of welds. As can be seen, this device is quite similar to the quick scan apparatus shown in FIG. 3. The device is formed of a carriage 130 on which is mounted a coil 132 connected to a regulatable DC source 133 for providing a magnetizing field. Also mounted on carriage 130 is a resonator-detector unit 134. The resonator section of this unit has a coil 136 which is connected to a variable AC oscillator 138. As with previous forms of resonator-detector units, coil 136 is wound around a soft iron core which tends to direct the low frequency alternating magnetic field into the article. The core may be of sufficient width to cover the weld and the desirable amount of parent metal. Attached to the resonator is a coil detector section 140 having a plurality of transversely spaced detector-coil assemblies which are generally similar to detector-coil assembly 18 of probe 10. There should be a sufficient number of detector-coil assemblies so that the transverse area under consideration will be fully covered. The detector coil assemblies are connected to an electronic switch 142 which will sequentially sample the output signal from each detector-coil assembly. The sampled signals from the detector-coil assemblies are then amplified by amplifier 144 and further processed for recording on a magnetic tape in tape deck 145 or other recording medium.

As with the recorded information from the analyzer, the tape containing the information relating to the welded area may be played back through tape deck 145 and the information fed into a cathode ray tube 146 of an oscilloscope which will visibly display the welded area. A camera 147 may be used to take a photograph of the picture on the cathode ray tube.

From a study of the visual presentation, it is possible to determine cracks, discontinuities or other porous conditions in the welded area. In FIG. 8, it can be seen that S is uniform throughout and represents an acceptable and satisfactory weld, whereas U has areas of nonuniformity which are caused by porosity, inclusion, etc., and represents an unacceptable weld. Both welds were performed by machine and from visual appearance seem to be of like quality. Previously it was only possible to obtain such information by X-ray methods.

As previously mentioned, the application of a low frequency alternating magnetic field to a magnetized article in which the intensity of the magnetized article is less than saturation makes it possible to also determine the depth of the defect. As mentioned, during the application of probe 10 the highest magnetic intensity reading will indicate the approximate location of the deepest point of penetration. However, this reading will not indicate the amount of penetration. If the article is set up in the analyzer shown in FIG. 4 and scanned, the location of the deepest penetration can be located, since, if there is a flaw and a magnetizing field is established which is normal to the defect, there will be more movement at the deepest point than at any other location. Such indication can be obtained from observation of meter 97 or by adjustment of intensity of the cathode ray tube.

If there is a pit in the article, the depth of it can be determined by holding scanner 64 of analyzer 60 stationary and varying opposed magnetizing fields at a predetermined rate. In such system, two opposed magnetizing fields are set up by coils 80–80 so that the fields come through the area of concern. This is accomplished by providing fields from coils 80–80 of the same intensity and spaced approximately equal distance from the flaw, one of the fields running clockwise and the other counterclockwise along the length of the pipe. Thus, the opposing forces of these fields will cause magnetic force lines to cut completely through the flaw at large angles to the pipe wall. The strength of the fields should be near saturation, but still below the knee of the magnetization curve for the material. For oilfield pipe, this is in the neighborhood of 2500 gaus per square inch of metal measured on a cross-sectional basis. The fields are set at the point just below saturation. Resonator-detector scanner 64 is set over the area with detector-coil assembly 67 spaced about 0.125 inches from the outer wall of the article. The frequency of oscillation is then adjusted by frequency control 85 of oscillator 82 to obtain a maximum reading on meter 97. The magnetizing fields are then decreased to zero at a constant rate. For this purpose, the analyzer may be provided with a motor 149 to control the regulation of DC current. It has been found that the fields may be decreased at a constant rate in about five seconds.

A test specimen is first used to calibrate the system. With the test specimen at maximum magnetization, the magnetizing fields are decreased at a constant rate. As the magnetizing current decreases, the output from the detector-coil assembly also decreases. A reference point of decreasing voltage output from the detector-coil assembly is selected. This reference point is the voltage output from the detector-coil assembly at the end of the period of decreasing the magnetic fields at a constant rate. For example, if the fields are decreased at a constant rate for five seconds, during testing of a test specimen of known wall thickness, then the output of the detector-coil assembly at the end of five seconds is selected as the reference voltage, and represents or is proportional to the magnetic intensity on the hysteresis loop reached at the end of the five second interval. This point is then set on the mercury cell of differential bridge 86.

FIG. 9 illustrates the retentivity portion of a hysteresis loop, showing at N where the selected magnetic intensity for the test specimen of nominal wall thickness fell on the curve at the end of the 5-second interval in which the magnetic intensity to the test specimens was decreased at a constant rate; and at T on a curve of a hysteresis loop where the same magnetic intensity of an article of less wall thickness will fall when the same magnetic field as applied to the test specimens is applied to this article and reduced at the same constant rate. Since such article does not have as much mass, the magnetic intensity T will occur on the retentivity slop at some time after decreasing of the magnetic field began less than five seconds two points N and T will be indicative of the mass and, therefore, the wall thickness. It has been found that the magnetizing field has to be varied from maximum to minimum and not from minimum to maximum. It appears that due to reluctance being a variable, if the wall thickness measurement is made while increasing the field, the results will not be constant.

To make wall thickness measurement, the system is calibrated by setting a standard point on the mercury cell in differential bridge 86. This standard voltage is equivalent to the voltage signal from the detector (after amplification) when the magnetic intensity reaches point N in FIG. 9. The unknown article is then positioned in the analyzer and, with the oscillator turned on, the magnetizing fields are decreased at a constant rate. When the amplified magnetic intensity detected by detector-coil assembly 67 reaches the point T equivalent to the level set on the mercury cell in differential bridge 86, a signal is generated. This signal is recorded on tape and fed into the cathode ray tube, the signal blacking out the phosphor.

FIG. 10 illustrates a pictorial representation taken at four different positions on a pipe. Also shown are the positions and the direction of the sweeping field. As can be seen, the field is directed into the pipe. The blacked-out portions indicate the extent of the mass. As can be seen from the cross section of the pipe, the greater the depth of the flaw, the closer the blacked-out area is to the base line BL. In order to obtain a pictorial representation such as in FIG. 10, for each test 1, 2, 3, and 4 made which begins at time BL with the start of the decreasing of the magnetic field, the sweep of the beam in an oscilloscope is restricted to the short horizontal excursions indicated as the bars 1, 2, 3, and 4 in FIG. 10. As the beam sweeps from base line BL for each of excursions 1, 2, 3, 4, it is blanked by the signal received when point N is reached for the normal wall thickness (bar 4 of FIG. 10), at the end of five seconds that the point T is reached for the lesser wall thicknesses represented by the bars 1, 2, and 3.

In other words, whenever the magnetic intensity of the unknown article equals the predetermined value of the test specimen a signal is generated which blacks out the cathode ray tube. The deeper the defect, the sooner the cathode ray tube is blacked out. Such a system may be used to check the depths of pronounced pits or spot check a particular area.

Figure 11:
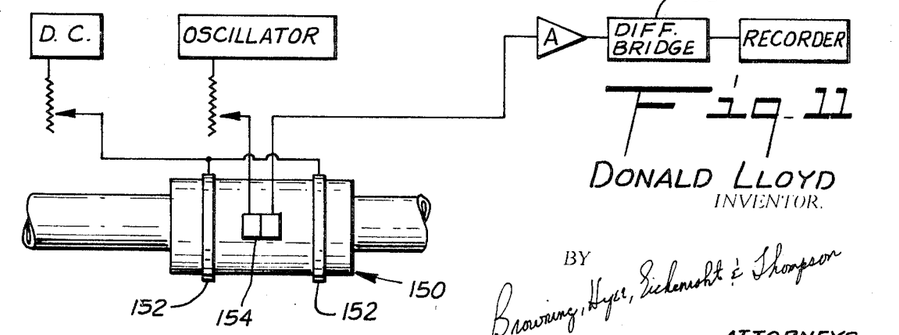
FIG. 11 is a view similar to FIG. 3 showing a system for determining wall thickness on a continuous basis.

If desired, the wall thickness measurement may be run on a continuous basis. Such an apparatus for performing this is shown in FIG. 11 where it can be seen that a carriage 150 is adapted to traverse the article. Mounted on the carriage are magnetizing coils 152–152 and a resonator-detector unit 154. In such event, since the magnetizing coil is on the carriage, the lines of force will change as the magnetizing coil moves. Accordingly, there will be a sweeping of the magnetic field by the moving resonator-detector unit. Again, the system is calibrated to determine the magnetic intensity from a test specimen. The standard is set in differential bridge 156 and any deviation from the standard will produce a signal. It may be desirable in such cases to only produce a signal when there is a predetermined percentage deviation from the standard.

As can be seen from the foregoing, the system of applying a low frequency alternating magnetic field to an article which has been magnetized to a level where the Barkhausen noise swells the greatest may be used in various ways to analyze electromagnetic articles.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A method for use in electromagnetically analyzing a ferromagnetic article, comprising the steps of establishing in the article to be analyzed a first magnetic field of an intensity greater than residual but less than saturation and in the range where the Barkhausen effect is substantial by applying a magnetic force to the article at the area of interest and increasing the strength of such applied magnetic force while measuring the magnetic intensity at the area of interest until substantially the largest detectable changes in the intensity of said first magnetic field occur for small but equal changes in said increasing applied field; applying a very low frequency alternating magnetic field to said area of interest of the magnetized article to interact with said first magnetic field and cause the magnetic domains of the article to move in synchronism with said alternating magnetic field, the frequency of said alternating magnetic field being substantially not greater than 20 cycles per second and at substantially that frequency at which the magnetic intensity at said area of interest is the greatest, and detecting the magnetic intensity induced in the area of interest in response to said first magnetic field and said alternating magnetic field while scanning the article to determine the presence, location or size of a flaw in the article.

2. The method specified in claim 1, wherein the step of detecting the magnetic intensity includes the steps of disposing at least one planar directionally sensitive detector coil in the area of interest to detect presence of a defect by detecting changes in said magnetic intensity, said coil providing different electrical outputs when at different directional orientations with respect to lines of magnetic flux and rotating said coils in its plane and about its axis to permit determination of the major axis of the defect.

3. The method specified in claim 1 including the steps of applying said very low frequency alternating magnetic field and detecting magnetic intensity along the length of each of a plurality of longitudinal sections of the article.

4. The method specified in claim 3, including the steps of applying said very low frequency alternating magnetic field and detecting magnetic intensity in stepped transverse increments along the length of the area of interest.

5. The method specified in claim 3, wherein the magnetic field established in the article is produced by the method of aligning a conductor parallel to the longitudinal axis of the material to be tested to produce a fully saturated circumferential magnetic field, placing one or more circumferential coils about the material and adjusting the field induced in the material to within range of the Barkhausen effect.

6. A method for analyzing an anomaly in a ferromagnetic article suspected of a defect, including the steps of inducing a magnetic field in said article, magnetizing the article to the range where the Barkhausen effect is substantial making a quick scan by moving a magnetic detector along said article and over the entire circumference of said article to detect the magnetic intensity of said article and determine the presence and general location of any such defects moving a directionally sensitive second magnetic detector for detecting the magnetic intensity of said article within the general location of any defect located and adjusting the directional orientation of said second detector to determine the direction of the major longitudinal axis and general boundaries of said defect, moving a third magnetic detector, for detecting the magnetic intensity of said article, across overlapping parts of said defect by a series of scans while transversing all of such defect to provide a voltage signal from said third detector during each scan the magnitude of which is proportional to the magnetic intensity about said defect and which can be converted to pictorially represent the details of the defect, and comparing the magnetic retentivity of said article in the area of the defect in response to a decreasing magnetic field applied to said article to the magnetic retentivity of a ferromagnetic article of known wall thickness in response to the same decreasing magnetic field to determine the wall thickness of said article at the defect.

7. Apparatus for nondestructive testing of a ferromagnetic article comprising, in combination: magnetizing means for applying a first magnetic field to said article less than saturation but in the range where the Barkhausen effect is substantial, said magnetizing means including means for increasing the strength of such applied magnetic force until substantially the largest detectable changes in the intensity of said first magnetic field occur for small but equal changes in said increasing applied field; means for measuring the changes in said first magnetic field in response to said increasing applied magnetic field; means for applying a low frequency alternating magnetic field to an area of interest of said article, said means including an oscillator having an alternating current output at a frequency not greater than 20 cycles per second and a coil connected to the output of said oscillator and adapted to be placed adjacent said area of interest to induce said alternating magnetic field and thereby cause magnetic domains in said area of interest to move, said oscillator including means for varying the output frequency thereof whereby the frequency of the oscillator can be adjusted to the frequency at which the greatest amount of movement of the magnetic domains occur, and means for detecting the magnetic intensity in the area of interest induced in response to said first magnetic field and said alternating magnetic field, the movement of said magnetic domains causing a voltage to be generated in said detecting means proportional to such movement, and means for mounting said detecting means to permit at least a partial scan of the article by said detecting means to determine the presence, locations, or size of a flaw in the article.

8. The apparatus of claim 7 wherein said last mentioned means includes a frame having a track extending along the length thereof and adapted to be mounted on said article; a resonator-detector unit mounted on said track and including said coil connected to said oscillator and a detector coil mounted therein, means for moving said resonator-detector unit along said track and means for transversely indexing said resonator-detector unit in stepped increments as it reaches one end of said track.

9. The apparatus of claim 8, wherein the detector coil is an elongated, directionally sensitive coil mounted for rotation within said unit, and includes means for rotating said detector coil.

10. The system specified in claim 8 further including a signal processing and readout means having a differential bridge with at least two inputs, one of said inputs being connected to a calibrated voltage source which may be preset to a selected value, and said other input connected to permit the signal from the detector coil assembly to be compared with the value of the voltage of said voltage source.

11. The apparatus of claim 8 further including third and fourth coils mounted on said resonator-detector unit adjacent said detector coil and for rotation with said detector coil, said third and fourth coils being wound in opposition for cancelling spurious signals.

12. A method of electromagnetically inspecting a ferromagnetic first article to determine its wall thickness, comprising tee steps of applying a first magnetic field greater than residual but less than saturation to a ferromagnetic second article having a known wall thickness to cause lines of magnetic flux to pass through an area of know wall thickness of said second article in substantially a radial direction with respect to said second article and provide an induced magnetic intensity in said article at a first level; decreasing said first magnetic field at a constant rate until the induced magnetic intensity in said article of known wall thickness reaches a predetermined second level less than said first level; applying a second magnetic field to said first article to cause lines of magnetic flux to pass through an area of interest in said first article substantially in a radial direction with respect to said first article to induce therein a magnetic intensity at said first level, decreasing said second magnetic field at the same constant rate that said first magnetic field was decreased until the induced magnetic intensity in said first article reaches said second level, and comparing the time it takes for the induced magnetic intensities in said first and second articles to reach said second level in each of said decreasing steps, said time comparison enabling the relative wall thickness of the first article to be determined.

13. The method of claim 12 further including the steps of applying a very low frequency magnetic field to each of said articles before each step of decreasing said first and second magnetic fields.